(12) United States Patent
Hill et al.

(10) Patent No.: US 12,528,588 B2
(45) Date of Patent: Jan. 20, 2026

(54) VARIABLE CHILLER EXHAUST WITH CROWN VENTILATION

(71) Applicant: The Boeing Company, Chicago, IL (US)

(72) Inventors: Eric A. Hill, Everett, WA (US); Brian C. Christenson, Arlington, WA (US); John C. Pizzichemi, Bothell, WA (US)

(73) Assignee: The Boeing Company, Arlington, VA (US)

( * ) Notice: Subject to any disclaimer, the term of this patent is extended or adjusted under 35 U.S.C. 154(b) by 412 days.

(21) Appl. No.: 18/102,442

(22) Filed: Jan. 27, 2023

(65) Prior Publication Data

US 2023/0166846 A1 Jun. 1, 2023

Related U.S. Application Data

(62) Division of application No. 16/862,146, filed on Apr. 29, 2020, now Pat. No. 11,591,093.

(51) Int. Cl.
*B64D 13/06* (2006.01)

(52) U.S. Cl.
CPC ........ *B64D 13/06* (2013.01); *B64D 2013/064* (2013.01); *B64D 2013/0655* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 7,871,038 | B2* | 1/2011 | Space | B64D 13/06 454/71 |
| 9,676,483 | B2* | 6/2017 | Godecker | F25D 17/02 |
| 2005/0210910 | A1* | 9/2005 | Rigney | B60H 1/00014 62/506 |
| 2010/0029190 | A1* | 2/2010 | Dessero | B64D 11/04 454/341 |
| 2011/0240795 | A1* | 10/2011 | Brugger | B64D 41/00 244/58 |
| 2015/0266353 | A1* | 9/2015 | Lu | B64D 13/08 62/506 |
| 2017/0038122 | A1* | 2/2017 | Lu | B64D 13/08 |
| 2017/0086335 | A1* | 3/2017 | Morioka | H05K 7/20136 |

* cited by examiner

*Primary Examiner* — Gordon A Jones
(74) *Attorney, Agent, or Firm* — Walters & Wasylyna LLC

(57) ABSTRACT

A variable chiller exhaust system incorporate a plurality of chillers, each driller having an inlet receiving air from a crown in an aircraft fuselage and an outlet connected to a manifold. A plurality of check valves are connected to the manifold and configured to maintain a differential back pressure on the plurality of chillers of 2" water pressure or less. The check valves vent into the crown. An exhaust conduit is connected to direct air from the manifold to a variable speed fan. An outflow valve exhausts air from the variable speed fan to an exterior of the fuselage.

20 Claims, 4 Drawing Sheets

VARIABLE CHILLER EXHAUST WITH CROWN VENTILATION

REFERENCES TO RELATED APPLICATIONS

This application is a divisional of U.S. application Ser. No. 16/862,146 filed on Apr. 29, 2020 entitled VARIABLE CHILLER EXHAUST WITH CROWN VENTILATION and having a common assignee with the present invention, the disclosure of which is incorporated herein by reference.

BACKGROUND INFORMATION

Field

This disclosure relates generally to the field of aircraft cabin environmental control and, more particularly to a variable chiller exhaust system employing a manifold having a plurality of check valves communicating with a crown in the aircraft fuselage and connected to a variable speed fan for selectively venting chiller process air into the crown or exhausting the air through an outflow valve.

Background

Commercial aircraft incorporate fuselages with upper and lower lobes and, typically, a cabin in the upper lobe. Humid air in the crown of the upper lobe can become cooled during a cruise segment of flight by contact with cold structure and equipment both inboard and outboard of insulation in the aircraft fuselage resulting in condensation. This condensation can freeze to the cold surfaces in flight and unfreeze when the aircraft lands or returns to lower/warmer altitude which may result in the undesirable phenomenon of "rain in the plane" and the water droplets formed may migrate through the aircraft to areas such as the cabin, aircraft equipment bays and the insulation. The water droplets formed by this freeze/thaw cycle may reduce operational life of aircraft components and impact the environment within the cabin. Currently, crown ventilation systems introducing dry air from cabin air conditioning packs and zonal dryers or other air drying systems in the aircraft environmental control system (ECS) are employed to dry the air in the crown.

Air flow from galley areas and associated equipment in the aircraft cabin is often exhausted through the lower lobe but airflow and thermal balancing of the aircraft can be a difficult issue to solve and can have detrimental impacts if not done correctly. Some impacts can be reverse airflow through the return air grills which can cause hot and smelly air from the lower lobe to reach the cabin impacting requirements for the aircraft ECS. Aircraft galleys typically employ chillers as a portion of the for refrigeration requirements. Airflow through the chillers creates heated air and existing chiller system merely exhaust the maximum flow needed for the chillers whenever the chiller exhaust system is on.

SUMMARY

Exemplary implementations of a variable chiller exhaust system incorporate a plurality of chillers, each chiller having an inlet receiving air from a crown in an aircraft fuselage and an outlet connected to a manifold. A plurality of check valves are connected to the manifold and configured to maintain a differential back pressure on the plurality of chillers of 2" water pressure or less. The check valves vent into the crown. An exhaust conduit is connected to direct air from the manifold to a variable speed fan. An outflow valve exhausts air from the variable speed fan to an exterior of the fuselage.

The exemplary implementations provide a method for crown temperature control wherein aircraft status is monitored and a maximum proportional output signal is issued from a controller to a variable speed fan responsive to an "on ground" status. A chiller process air output stream is exhausted from a manifold to the variable speed fan and through an outflow valve to the exterior of the fuselage. A minimum proportional output signal is issued from the controller to the variable speed fan responsive to an "at cruise" status and substantially all of the process air output stream is vented through a plurality of check valves into a crown of the fuselage.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a variable chiller exhaust system which enhances crown ventilation. Chillers associated with each galley in the cabin receive inlet air from the crown of the fuselage. A manifold receives exhaust air from the chillers and employs an exhaust conduit from the upper lobe to the lower lobe to feed the exhaust air through a variable speed fan connected to an outflow valve from the lower lobe to the exterior of the aircraft fuselage. Multiple check valves dispersed on the manifold in the crown supply air from the manifold to the crown when the variable speed fan is off. A controller governs the flow of heated air from chillers into the crown or to the lower lobe based on 1) the demand on the chillers (e.g., the pressure or number of chillers in use) and 2) the state of the aircraft (e.g., on ground or at cruise).

Figure 1:
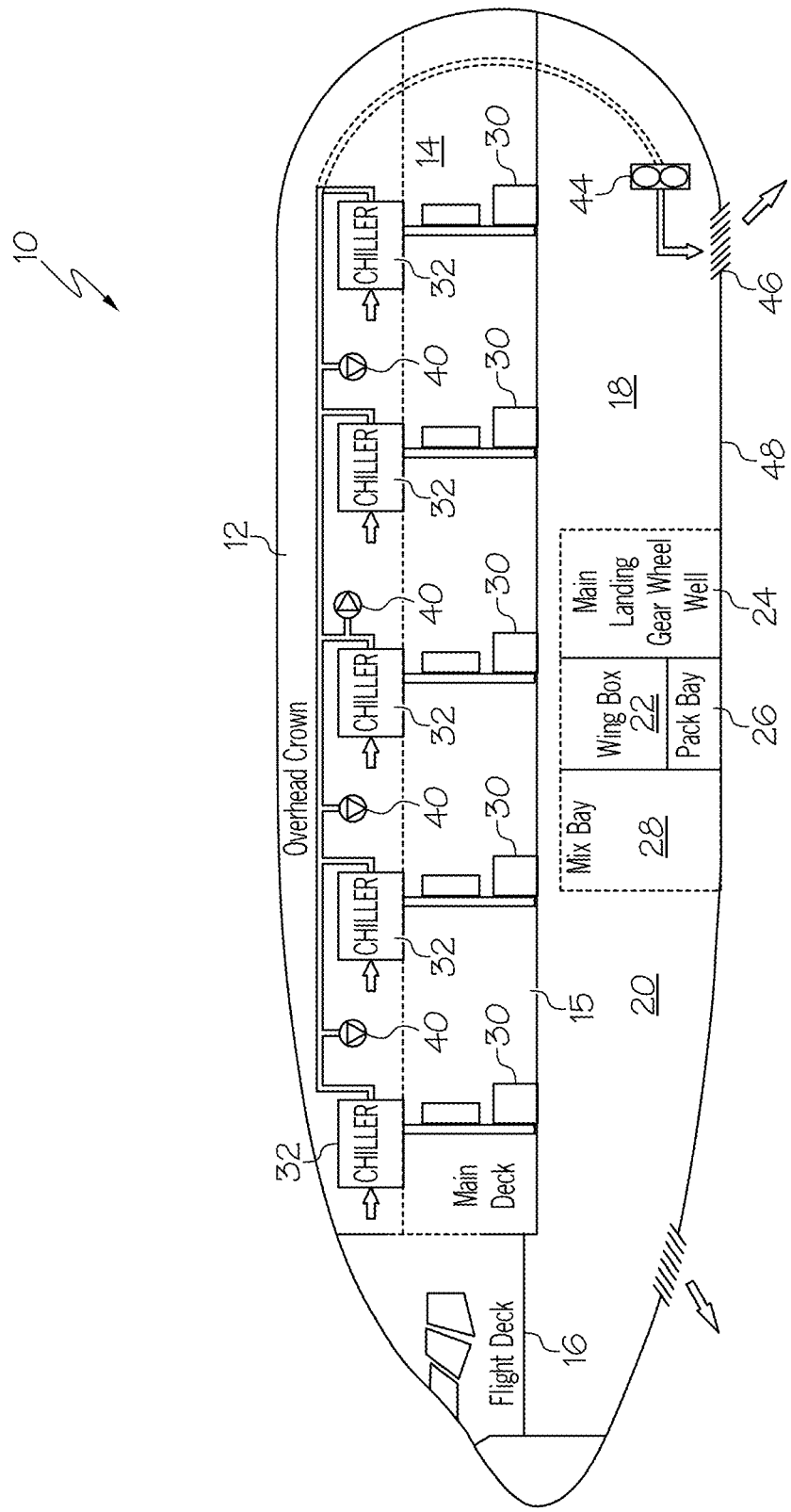
FIG. 1 is a schematic representation of an aircraft fuselage in which an example implementation of the variable chiller exhaust system is employed.

Referring to the drawings, FIG. 1 shows an exemplary implementation of the variable chiller exhaust system in an aircraft fuselage 10. The fuselage 10 incorporates a crown 12 over an aircraft cabin 14 housed on a main deck 15. A flight deck 16 extends forward of the main deck 15. A lower lobe 18 is present below the main deck 15 and flight deck 16 and houses one or more aircraft cargo compartments 20 and other aircraft systems including, for example, the wing box 22 and main landing gear wheel well 24, as well as bays such as pack bay 26 and mix bay 28. Galleys 30 are dispersed at various locations in the cabin 14 depending on the size and configuration of the aircraft and cabin. Chillers 32 are associated with each galley 30 and located in the crown 12 over the cabin 14 at the galley locations.

Figure 2:
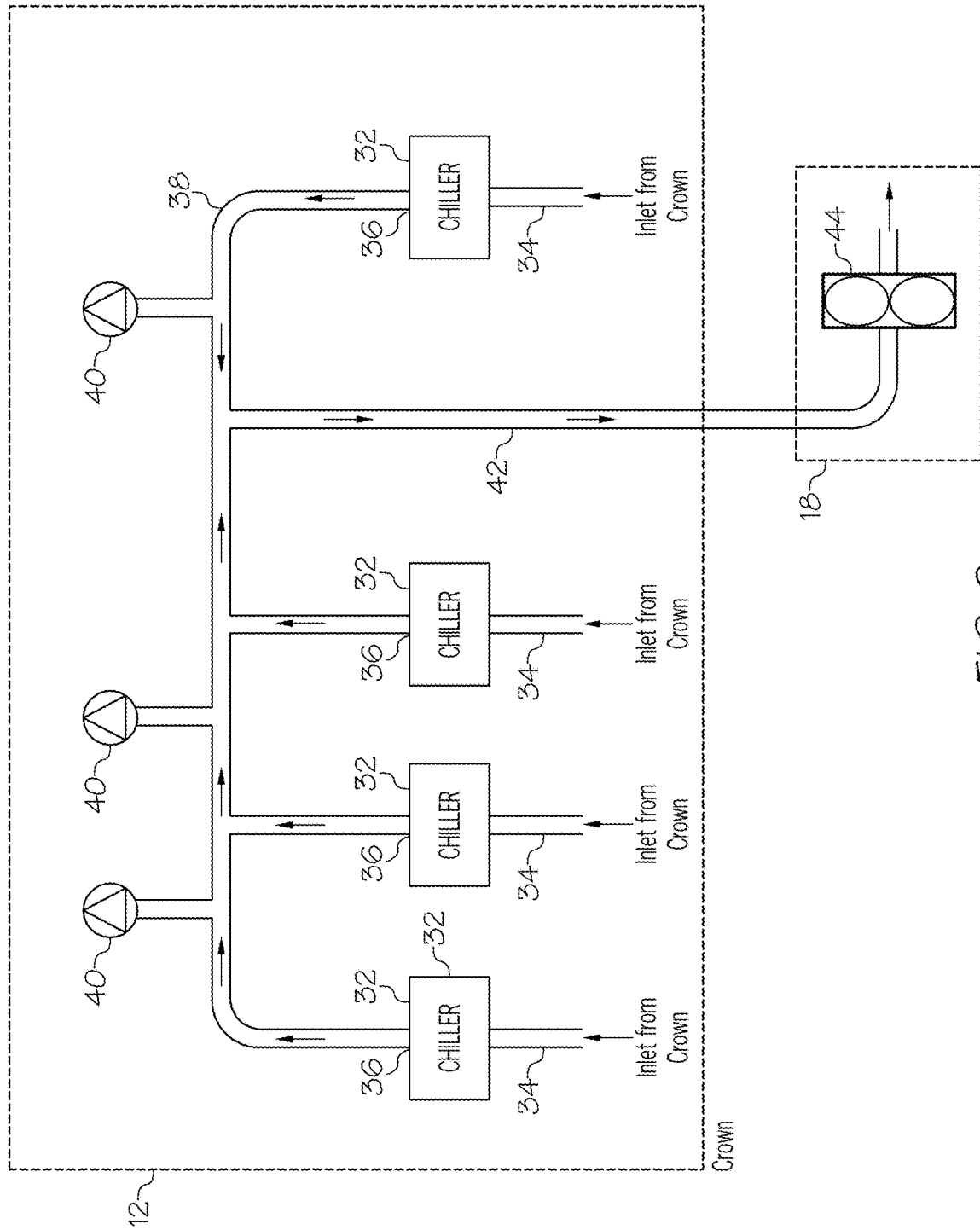
FIG. 2 is a block diagram of the operating components of example the implementation.

As seen in FIG. 2, each chiller 32 has an inlet 34 receiving air from the crown for process air in the chiller. The chillers employ a refrigeration cycle which results in an output stream of the process air having an elevated temperature. An outlet 36 from each chiller 32 is connected to a manifold 38 running through the crown 12 and receiving the process air output stream. Multiple check valves 40 are connected to the manifold 38 in the crown 12. The check valves 40 are positioned to vent hot air from the manifold 38 into the crown 12, as will be described in greater detail subsequently. The manifold 38 is connected by an exhaust conduit 42 routed from the crown 12 to the lower lobe 18 and connected to direct air from the manifold to a variable speed fan 44. The variable speed fan 44 exhausts air from the exhaust conduit 42 through an outflow valve 46 between the lower lobe 18 and the exterior 48 of the fuselage 10 (as seen in FIG. 1). The variable speed fan 44 provides a range of flow rates from a maximum flow rate to an off or minimum flow rate allowing proportional exhausting of the hot process air stream from the chillers to the aircraft exterior or through the check valves to the crown to maintain a predetermined crown temperature. The number and location of the check valves 40 in the manifold are configured to provide a predetermined differential back pressure, which for the example implementation is 2" of water or less, between each chiller outlet 36 and the exhaust conduit 42 for optimum chiller operation. The variable speed fan 44 in the example implementation is configured to provide flow rates of between 220 and 500 CFM for each of the chillers 32 connected to the manifold for exhausting chiller air through the outflow valve 46. The check valves 40 additionally act as pressure relief valves in conditions of greater than 2" of water pressure differential in the manifold 38 allowing flow from the chiller outlets 36 and manifold 38 into the crown with the variable speed fan 44 off or at reduced flow.

Figure 3:
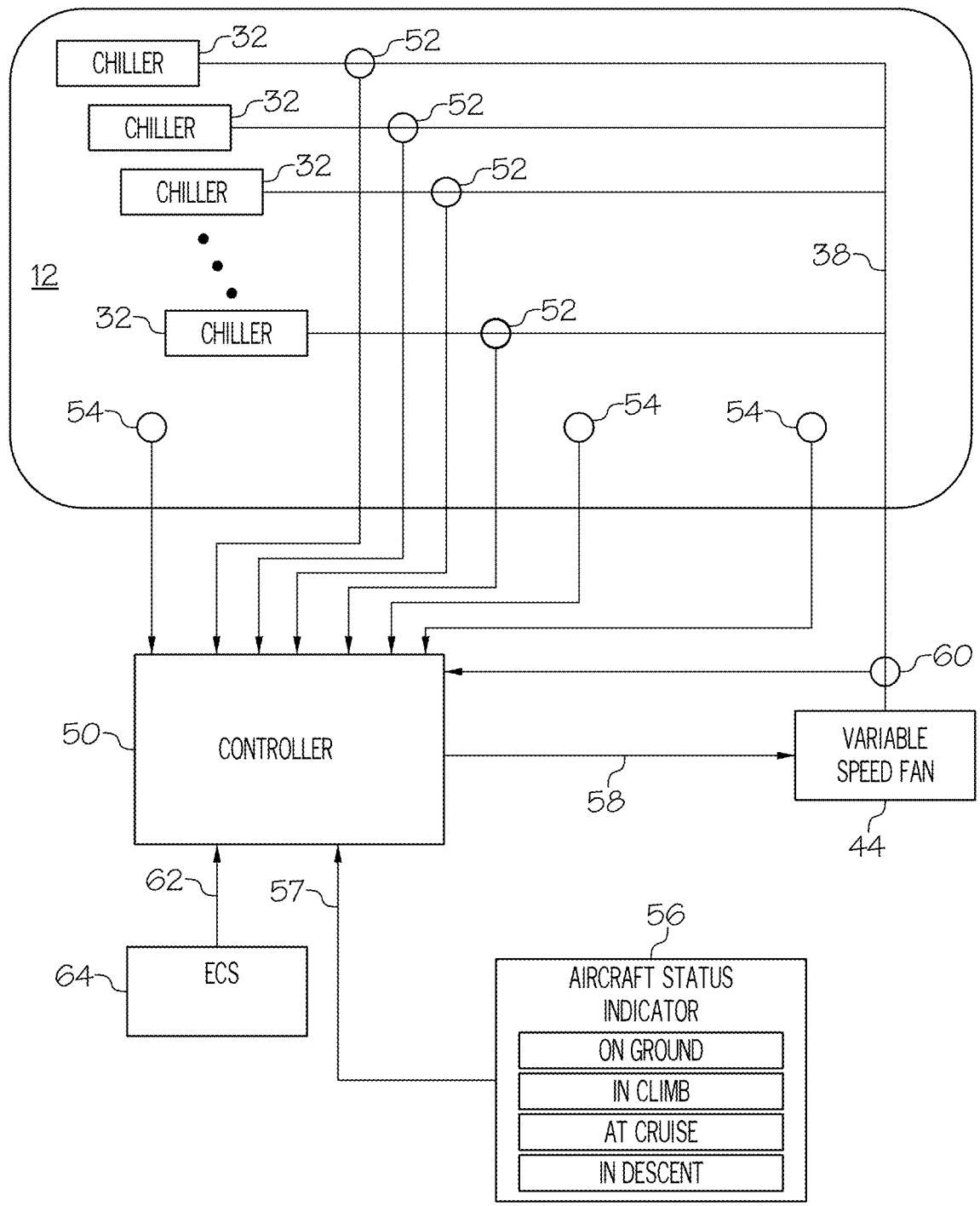
FIG. 3 is a block diagram of the control system for the variable speed fan; and, FIG. 4 is a flow chart of a method for crown temperature control using the exemplary implementations.

A controller 50 determines the flow rate through variable speed fan 44 as shown in FIG. 3 based on predetermined requirements which may include one or more of aircraft status, manifold back pressure, crown temperature, or direct ECS or pilot input. Various sensors providing control inputs such as one or more pressure sensors 52 may be mounted associated with each chiller outlet 36 or at one or more locations in the manifold 38. Similarly, one or more temperature sensors 54 may be mounted in the crown 12. An aircraft status indicator 56 is connected to provide a status signal 57 to the controller 50 indicating one or more states of the aircraft as "on ground", "in climb", "in cruise" and "in descent". Status may be obtained by the status indicator from altimeter output, landing gear position, flap position, or similar automated or active portion of the flight control system (FCS), or pilot or crew manual control. The controller 50, responsive to the status signal 57 and other control input, provides a proportional output signal 58 to the variable speed fan 44 for a fan speed to induce a flow rate of air from the manifold to provide the crown temperature predetermined for that aircraft status. A flow rate indicator 60 may provide feedback to the controller for closed loop control. A temperature command 62 may also be provided to the controller by the ECS 64 for integrated temperature control of the crown based on ECS requirements for cabin heating, cooling or other aircraft functions.

In operation, if an "on ground" status is present, no crown heating is typically required, and the controller 50 provides a maximum proportional output signal 58 to the variable speed fan 44 to exhaust substantially all flow from the chiller outlets through the manifold and exhaust conduit to exit the aircraft through the outflow valve. If, however, ECS system operation on a cold day requires cabin heating, the ECS temperature command may be adjusted to the controller which, in turn, reduces the flow rate of the variable speed fan 44 to allow heated outlet stream air from the chillers 32 through the check valves 40 into the crown to supplement ECS heating. Similarly, absent other sensor input as described below, if an "at cruise" status is present, the controller 50 provides a minimum proportional output signal 58 to the variable speed fan 44, substantially turning the fan off, to maximize flow from the manifold 38 through the check valves 40 into the crown 12 to maintain higher crown temperature. If the crown temperature, as indicated by one or more of the temperature sensors 54 indicates a temperature in excess of a predetermined maximum which might impact other ECS operations, the proportional output signal is adjusted by the controller for speed of the variable speed fan 44 to exhaust a portion of the chiller outlet stream air in the manifold 38 to maintain the crown temperature below the predetermined maximum. Similarly, if crown pressure conditions exceed the 2" water optimum pressure differential for the operation of the chillers as indicated by the pressure sensors, the controller increases the proportional output signal to increase the speed of the variable speed fan to reduce pressure in the manifold. Status conditions of "in climb" or "in descent" may result in proportional control of variable speed fan 44 by the controller 50 based on temperature and pressure sensor control inputs to achieve a predetermined crown temperature profile while maintaining optimum pressure differential for operation of the chillers.

Figure 4:
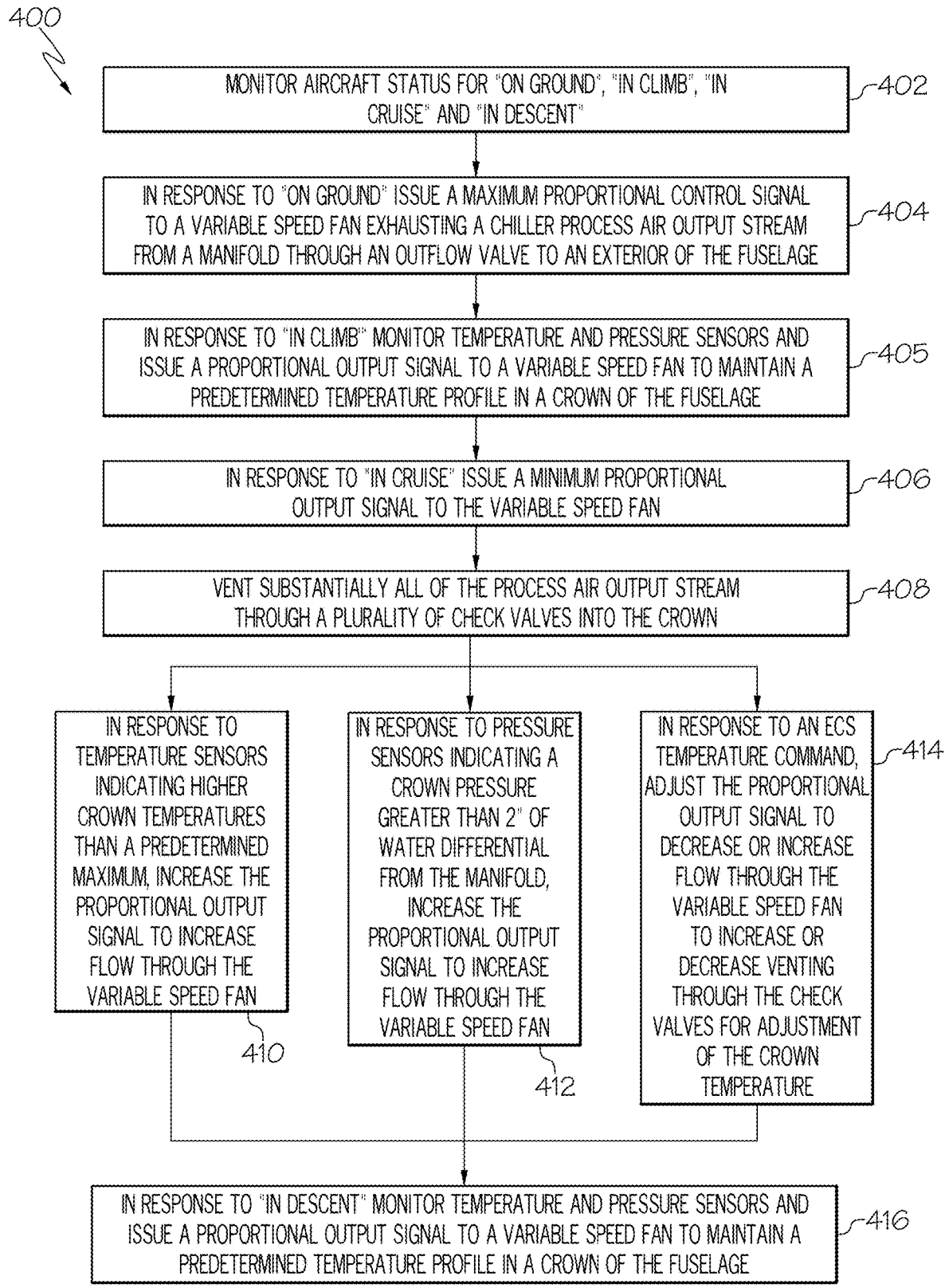

The example implementation disclosed provides a method 400 for crown temperature control as shown in FIG. 4. Aircraft status is monitored, step 402. In response to an "on ground" status, a controller issues a maximum proportional output signal to a variable speed fan, step 404, exhausting a chiller process air output stream from a manifold through an outflow valve to the exterior of the fuselage. In response to an "in climb" status, the controller monitors temperature and pressure sensors and issues a proportional output signal to the variable speed fan to maintain a predetermined temperature profile in the crown, step 405. In response to an "in cruise" status the controller issues a minimum proportional output signal to the variable speed fan, step 406, resulting in substantially all of the process air output stream venting through a plurality of check valves into a crown of the fuselage, step 408. In response to temperature sensors indicating higher crown temperatures than a predetermined maximum, the controller increases the proportional output signal to increase flow through the variable speed fan, step 410. In response to pressure sensors indicating a crown pressure greater than 2" of water differential from the manifold, the controller increases the proportional output signal to increase flow through the variable speed fan, step 412. In response to an ECS temperature command, the controller adjusts the proportional output signal to decrease or increase flow through the variable speed fan to increase or decrease venting through the check valves for adjustment of the crown temperature, step 414. In response to an "in descent" status, the controller monitors temperature and pressure sensors and issues a proportional output signal to the variable speed fan to maintain a predetermined temperature profile in the crown, step 416.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "forward" and "aft", "upper" and "lower", and "clockwise" and "counter-clockwise" are employed to describe relative positioning and motion and other than for the specific implementations disclosed may be substituted or reversed with appropriate descriptors such as "first" and "second", "top" and "bottom" or "right" and "left" depending on orientation of actual implementation.

What is claimed is:

1. A method for crown temperature control comprising:
monitoring a status of an aircraft;
issuing a maximum proportional output signal from a controller to a variable speed fan responsive to an "on ground" status;
exhausting a chiller process air output stream from a manifold to the variable speed fan and through an outflow valve to an exterior of a fuselage of the aircraft, wherein the manifold is connected to a plurality of chillers associated with a plurality of galleys;
issuing a minimum proportional output signal from the controller to the variable speed fan responsive to an "in cruise" status; and
venting substantially all of the chiller process air output stream through a plurality of check valves into a crown of the fuselage.

2. The method as defined in claim 1 further comprising:
monitoring temperature and pressure sensors responsive to an "in climb" status or an "in descent" status; and
issuing a proportional output signal from the controller to the variable speed fan to maintain a predetermined temperature profile in the crown.

3. The method as defined in claim 1 further comprising:
increasing a proportional output signal from the controller to increase flow through the variable speed fan responsive to temperature sensors indicating higher crown temperatures than a predetermined maximum.

4. The method as defined in claim 1 further comprising:
increasing a proportional output signal from the controller to increase flow through the variable speed fan responsive to pressure sensors indicating a crown pressure greater than 2" of water differential from the manifold.

5. The method as defined in claim 1 further comprising:
adjusting a proportional output signal from the controller to decrease or increase flow through the variable speed fan to increase or decrease venting through the check valves for adjustment of temperature in the crown responsive to an ECS temperature command.

6. The method of claim 1 further comprising:
issuing a first proportional output signal from the controller to the variable speed fan responsive to a first status of the aircraft;
exhausting at least a portion of the process air output stream from the manifold to the variable speed fan and through the outflow valve;
issuing a second proportional output signal from the controller to the variable speed fan responsive to a second status of the aircraft; and
venting substantially all of the chiller process air output stream through the plurality of check valves, wherein the plurality of check valves are connected to the manifold and configured to maintain a predetermined differential back pressure on the plurality of chillers, said check valves venting into the crown of the fuselage.

7. The method as defined in claim 1 wherein the fuselage has a lower lobe and the exhaust conduit is routed from the crown to the lower lobe and the step of exhausting the chiller process air output stream includes routing the chiller process air from the crown to the lower lobe.

8. The method as defined in claim 1 wherein at least one temperature sensor senses a temperature in the crown and provides a temperature control input to the controller and at least one pressure sensor in the manifold provides a pressure control input to the controller, and further comprising issuing a proportional output signal by the controller based on the temperature and pressure control inputs to achieve a predetermined crown temperature profile while maintaining optimum pressure differential for operation of the chillers.

9. The method as defined in claim 1 wherein the aircraft status comprises at least one of "on ground" and "at cruise" and wherein issuing the first proportional output signal comprises issuing a maximum proportional output signal responsive to an "on ground" status and issuing the second proportional output signal comprises issuing a minimum proportional output signal responsive to an "in cruise" status.

10. The method as defined in claim 1 further comprising receiving a temperature command from an environmental control system to the controller.

11. The method as defined in claim 10 further comprising issuing a proportional output signal by the controller based on the based on the temperature command from the environmental control system.

12. The method of claim 1 further comprising:
receiving in a controller a status signal indicating the status of the aircraft;
issuing a proportional output signal from the controller based on the status of the aircraft to the variable speed fan exhausting at least a portion of the process air output stream from the manifold to the variable speed fan responsive to the status signal.

13. The method as defined in claim 12 further comprising providing a pressure control input to the controller from at least one pressure sensor sensing pressure in the manifold.

14. The method as defined in claim 13 further comprising providing a temperature control input to the controller from at least one temperature sensor sensing temperature in the crown.

15. The method as defined in claim 14 further comprising providing the proportional output signal from the controller based on one or both of the pressure control input and the temperature control input.

16. The method as defined in claim 15 wherein said proportional output signal is issued by the controller based on the temperature and pressure control inputs to achieve a predetermined crown temperature profile while maintaining optimum pressure differential for operation of the chillers.

17. The method of claim 1 wherein the plurality of chillers are located in the crown of the fuselage at locations of the galleys.

18. The method of claim 1 wherein each chiller comprises an inlet receiving air from the crown and an outlet connected to the manifold.

19. The method of claim 1 wherein the manifold is connected to an exhaust conduit to direct at least a portion of the chiller process air output stream to the variable speed fan.

20. A method for crown temperature control comprising:
monitoring a status of an aircraft;
issuing a maximum proportional output signal from a controller to a variable speed fan responsive to an "on ground" status;
monitoring temperature and pressure sensors responsive to an "in climb" status or an "in descent" status;
issuing a proportional output signal from the controller to the variable speed fan to maintain a predetermined temperature profile in the crown;
exhausting a chiller process air output stream from a manifold to the variable speed fan and through an outflow valve to an exterior of a fuselage of the aircraft, wherein the manifold is connected to a plurality of chillers associated with a plurality of galleys;
issuing a minimum proportional output signal from the controller to the variable speed fan responsive to an "in cruise" status;
venting substantially all of the chiller process air output stream through a plurality of check valves into a crown of the fuselage; and
increasing a proportional output signal from the controller to increase flow through the variable speed fan responsive to the temperature sensors indicating higher crown temperatures than a predetermined maximum.

* * * * *